United States Patent [19]

Wright

[11] Patent Number: 4,689,929
[45] Date of Patent: Sep. 1, 1987

[54] FASTENER FOR A READILY DISENGAGEABLE INTERIOR PANEL

[76] Inventor: James D. Wright, 110 Pennsylvania Ave., Bangor, Pa. 18013

[21] Appl. No.: 888,054

[22] Filed: Jul. 21, 1986

[51] Int. Cl.⁴ .............................................. E04H 1/00
[52] U.S. Cl. ...................................... 52/239; 52/731; 52/222; 52/730; 403/381; 403/254
[58] Field of Search ................. 52/731, 829, 239, 222, 52/585, 730; 403/187, 331, 338, 387, 399, 381, 254

[56] References Cited

U.S. PATENT DOCUMENTS

| | | | |
|---|---|---|---|
| 3,884,002 | 5/1975 | Logie | 52/585 X |
| 4,112,643 | 9/1978 | Decker | 52/829 X |
| 4,250,676 | 2/1981 | Presby | 52/222 |
| 4,490,064 | 12/1984 | Ducharme | 403/254 X |

Primary Examiner—Carl D. Friedman
Attorney, Agent, or Firm—Ruth Moyerman

[57] ABSTRACT

A pair of snap fitted linear rigid strut members together defining a panel frame end is disclosed. A male member includes a matrix which defines at least one linear channel and a part of a linear shaft internal to the matrix. A female member also includes a matrix which defines part of a panel edge. A fabric panel cover surrounds at least a portion of the female member to conceal the joinder.

4 Claims, 8 Drawing Figures

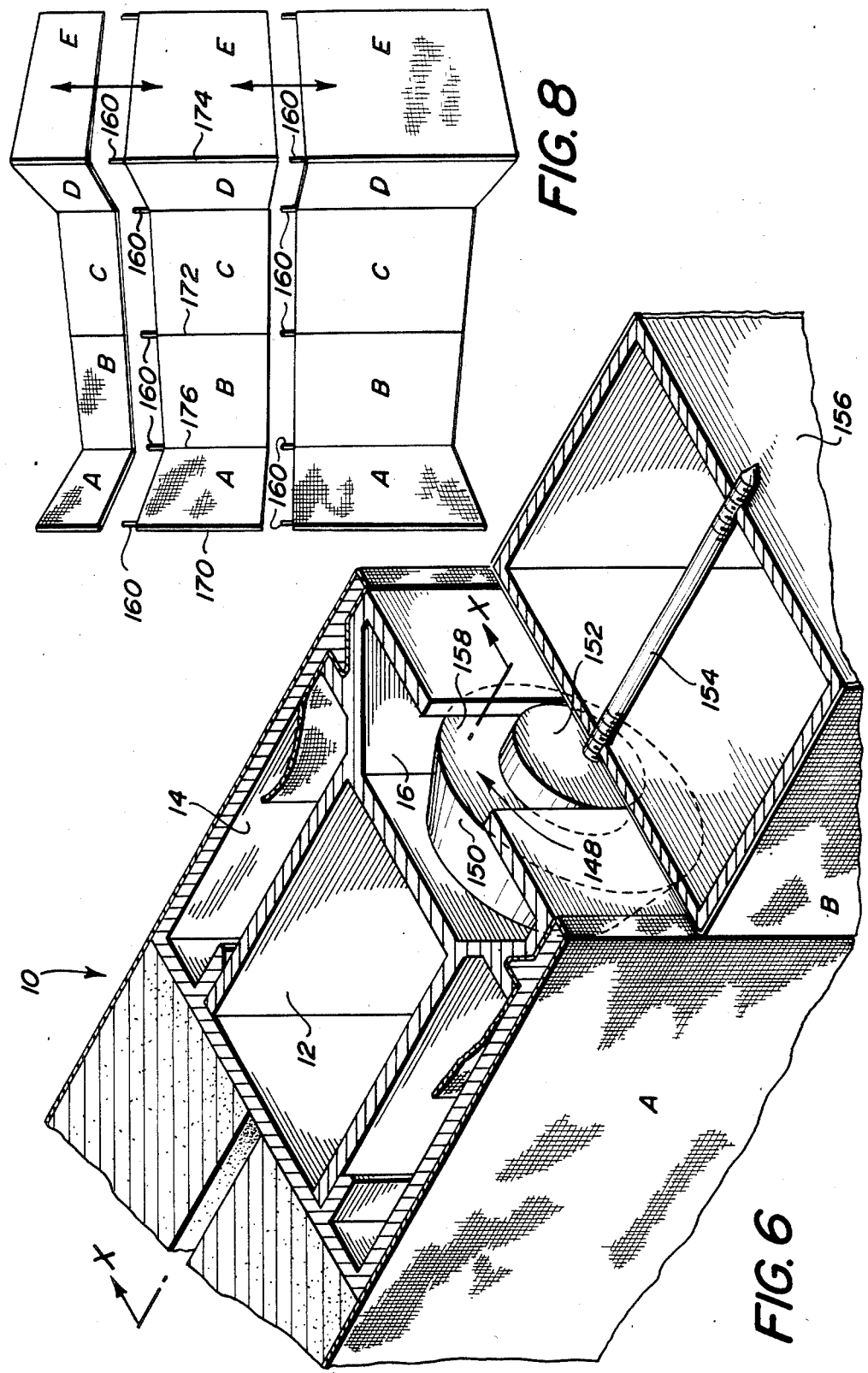

FASTENER FOR A READILY DISENGAGEABLE INTERIOR PANEL

BACKGROUND OF THE INVENTION

1. Field of the Invention

This invention relates to static structures, and more particularly to fasteners for interior panels.

2. Description of the Prior Art

Modular display systems used for advertising and product presentation, most generally at industrial and trade shows, are an important and effective means for introducing one's sales message or products to consumers. Such systems generally include interchangeable panels joined together to form such things as walls, shelving, counters, cabinets and/or projection screens.

While such known systems perform the intended functions, there is a gross aesthetic inadequacy among all known systems as they have exposed structural members or frames that serve to join or connect one panel or component to the next.

No device is known in which these joinders or fasteners are concealed within the panel itself, thereby permitting a message or display to aesthetically continue from one panel to the next.

SUMMARY OF THE DISCLOSURE

The aforementioned prior art problems are obviated by the device of this invention in which the primary connector is concealed within the panel frame, and in which a pair of snap fitted rigid strut members together define a panel frame end. A male member includes a matrix which defines at least one linear channel and at least a part of a linear shaft internal to the matrix. A female member also includes a matrix which defines part of a panel edge. A fabric, or like, panel cover surrounds at least a portion of the female matrix and is internally held by the male member to cover at least a portion of the female member, and this conceals the joinder.

It is, therefore, an object of this invention to provide a panel joinder for interchangeable component parts that is concealed within the cover frame of the panel to create a custom, continuous lock.

It is another object of this invention to provide a series of concealed panel joinders that can connect to each other in straight lines, acute angles, right or obtuse angles.

It is yet another object of this invention to provide panel joinders that aid in forming walls, shelving, counters, cabinets and/or projection screens.

BRIEF DESCRIPTION OF THE DRAWING(S)

FIG. 6 is an isometric, cutaway view of the device of this invention showing the joining of the strut members to the panel and the joining of one panel to another by way of a button-type fastener.

FIG. 8 is a schematic view of the device of this invention showing panels stacked atop, and end on end, of each other at different angles.

DETAILED DESCRIPTION OF THE PREFERRED EMBODIMENT(S)

Figure 1:
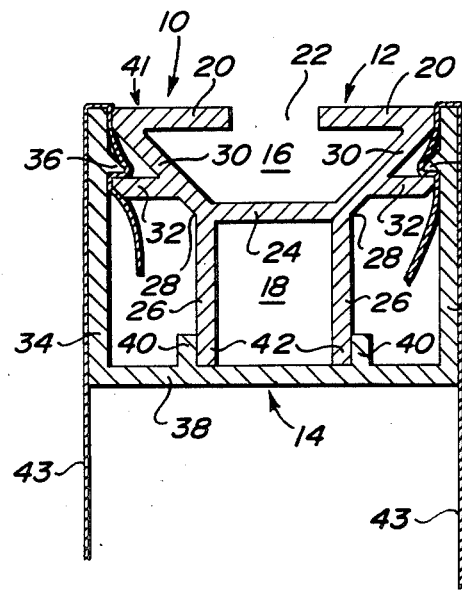
FIG. 1 is a transverse cross sectional view of the device of this invention showing the preferred embodiment used for linear runs.

Referring now to the drawings, and more particularly to FIG. 1, a cross sectional view of preferred embodiment 10 is shown with male matrix 12 and female matrix 14. Male matrix 12 forms linear channel 16 and part of linear shaft 18 internal to male matrix 12. Male matrix 12 and female matrix 14 form sides at right angles.

Channel 16 is a trapezoid with longer parallel side 20 including slit 22 midpoint to receive the shaft of a button-type fastener. Side 20 forms one side of male matrix 12. Channel 16's short parallel side 24 forms the top side of shaft 18. The shaft is also formed by two parallel sides 26 projecting from trapezoid channel 16's short side 24 at corners 28. Sides 24, 26 and 26 form a portion of square shaft 18 adapted to receive a pin. Nonparallel sides 30 of trapezoid channel 16 include outward projecting horizontal flanges 32.

Female matrix 14 is generally U shaped and sized to overfit male matrix 12. U walls 34 each include inwardly projecting flange 36 along a line adapted to snap fit above and with each corresponding male flange 32. Bottom 38 of female matrix 14 includes a pair of upward projecting parallel rails 40 to register and outerfit with parallel arm ends 42 of shaft 18.

Fabric panel cover 43 originates from a panel cover (not shown) to cover walls 34 of female matrix 14 and terminates between male matrix 12 and female matrix 14 to form panel end 41 for linear runs.

Figure 2:
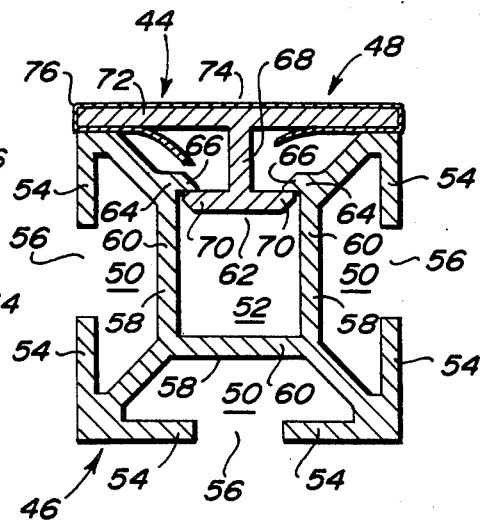
FIG. 2 is a transverse cross sectional view of the device of this invention showing an alternate embodiment used to make a T out of straight panels.

Referring now to FIG. 2, a cross sectional view of alternate embodiment 44 is shown with male matrix 46 and female matrix 48. Male matrix 46 forms three linear channels, each numbered 50, and part of linear shaft 52 internal to male matrix 46. Male matrix 46 and female matrix 48 form sides at right angles.

Channels 50 are trapezoids with longer parallel sides 54 including slits 56 midpoint to receive the shaft of a button-type fastener. Sides 54 form three sides of male matrix 46. Channels 50 short parallel sides 58 form the three walls 60 of shaft 52. Walls 60 form a portion of shaft 52 adapted to receive a pin, and leave open top 62. Nonconnected side ends 64 terminate in inward projecting horizontal flanges 66.

Female matrix 48 comprises a T shape. Leg 68 of female matrix 48 terminates in opposing outward projecting flanges 70 along a line adapted to snap fit above corresponding flanges 66 of male matrix 46. Arm 72 of female matrix 48 fits against and spans nonchannel side 74 of male matrix 46.

Cover 76 surrounds female matrix 48 and terminates between male matrix 46 and female matrix 48 to form a T out of straight panels.

Figure 3:
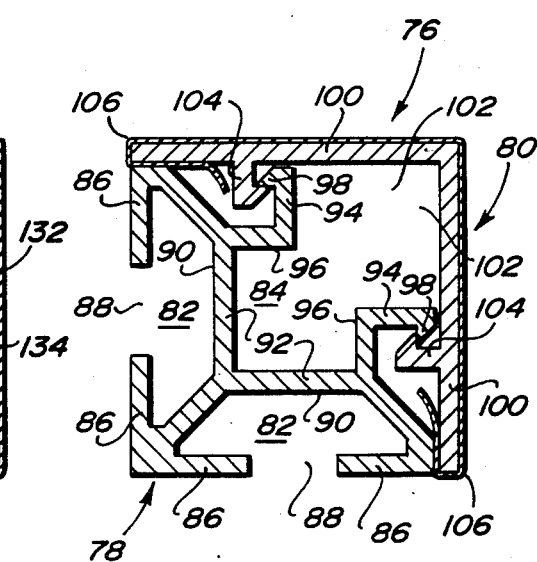
FIG. 3 is a transverse cross sectional view of the device of this invention showing another alternate embodiment used to make 90° angles.

Referring now to FIG. 3, a cross sectional view of another alternate embodiment 76 is shown with male matrix 78 and female matrix 80. Male matrix 78 forms two linear channels, each numbered 82, and part of linear shaft 84 internal to male matrix 78. Male matrix 78 and female matrix 80 form sides at right angles.

Channels 82 are trapezoids with longer parallel sides 86 including slits 88 midpoint to receive the shaft of a button-type fastener. Sides 86 form two dies of male matrix 78. Channels 82 short parallel sides 90 form the two complete walls 92 joined at right angles of shaft 84. Linear flange hooks 94 form partial shaft sides 96. Each hook 94 terminates in outward projection 98. Sides 90 and partial sides 96 form a portion of a square adapted to receive a pin.

Female matrix 80 comprises an L shape with equal legs 100 sized to outerfit male matrix 78 along nonchanneled sides 102. Each leg 100 includes inward projecting flange hook 104 along a line adapted to snap fit with corresponding projection 98 of male matrix 78.

Fabric cover 106 surrounds female matrix 80 and terminates between male matrix 78 and female matrix 80 to form 90° angles from straight panels.

Figure 4:
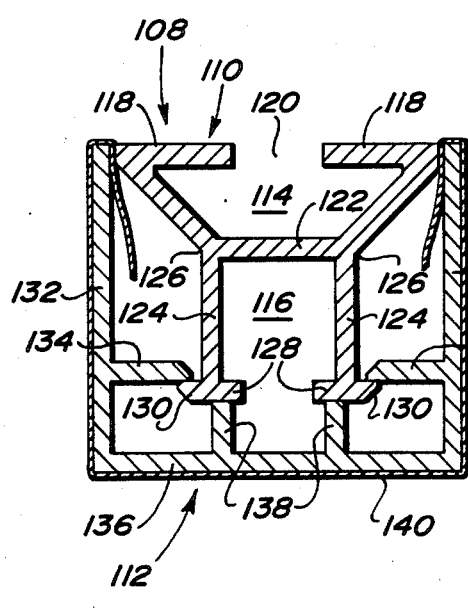
FIG. 4 is a transverse cross sectional view of the device of this invention showing still another alternate embodiment used to finish the end of a panel run.

Referring now to FIG. 4, a cross sectional view of still another alternate embodiment 108 is shown with male matrix 110 and female matrix 112. Male matrix 110 forms linear channel 114 and part of linear shaft 116. Male matrix 110 and female matrix 112 form sides at right angles.

Channel 114 is a trapezoid with longer parellel side 118 including slit 120 midpoint to receive the shaft of a button-type fastener. Side 118 forms one side of male matrix 110. Channel 114's short parallel side 122 forms the top side of shaft 116. The shaft is also formed by two parallel sides 124 projecting from trapezoid channel 114's short side 122 at corners 126. Sides 122, 124 and 124 form a portion of square shaft 116 adapted to receive a pin. Sides 124 terminate in feet 128 which include outward projecting flange 130 each parallel to top side 122.

Female matrix 112 is generally U shaped and sized to overfit male matrix 110. U side walls 132 each include inward projecting horizontal flange 134 at a point adapted to snap fit above and with corresponding flange 130 of male matrix 110. Bottom 136 of female matrix 112 includes a pair of parallel rails 138 to register and rest on corresponding foot 128 of male matrix 110.

Fabric cover 140 surrounds female matrix 112 and terminates between male matrix 110 and female matrix 112 to finish the end of a panel run.

Figure 5:
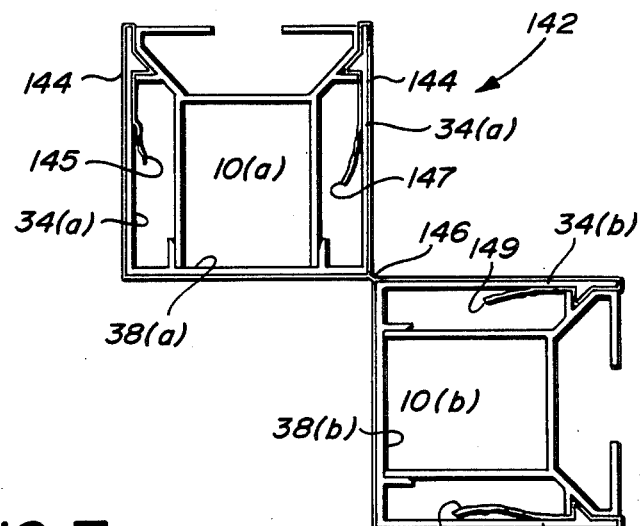
FIG. 5 is a cross sectional view of the device of this invention showing the combining of two preferred embodiments used to join panels at any desired angle.

Referring now to FIG. 5, a cross sectional view of yet another alternate embodiment 142 is shown combining two preferred embodiments 10a and 10b by fabric cover 144. One piece of fabric cover 144 begins between male and female matrix 10a at point 145, running along its left side wall 34a to bottom 38a, thereby continuing on to embodiment 10b along its bottom 38b to right side wall 34b and terminating between male and female matrix 10b at point 146. Another piece of fabric cover 144 begins between male and female matrix 10a at point 147, running along its right side 34a, thereby continuing on to embodiment 10b along its left side 34b and terminating between male and female matrix 10b at point 149. Matrix 10a and 10b are movably joined at point 146 so that panels may be joined at any angle.

Referring now to FIG. 6, an isometric view of the device of this invention shows the joining of snap fit strut members 12 and 14 (as shown in FIG. 1) into panel A and the joining of panel A to panel B by the cooperation of embodiment 10, with button-type fastener 148 of panel B thereby producing a linear run. Button fastener 148 includes head 150, shaft 152 and securing screw 154. Fastener 148 is seen secured to wall 156 of panel B by screw 154. Head 150 has been slid into channel 16 of embodiment 10 by way of shaft 154 fitting into slit 158, thereby fastening panel A to panel B.

Figure 7:
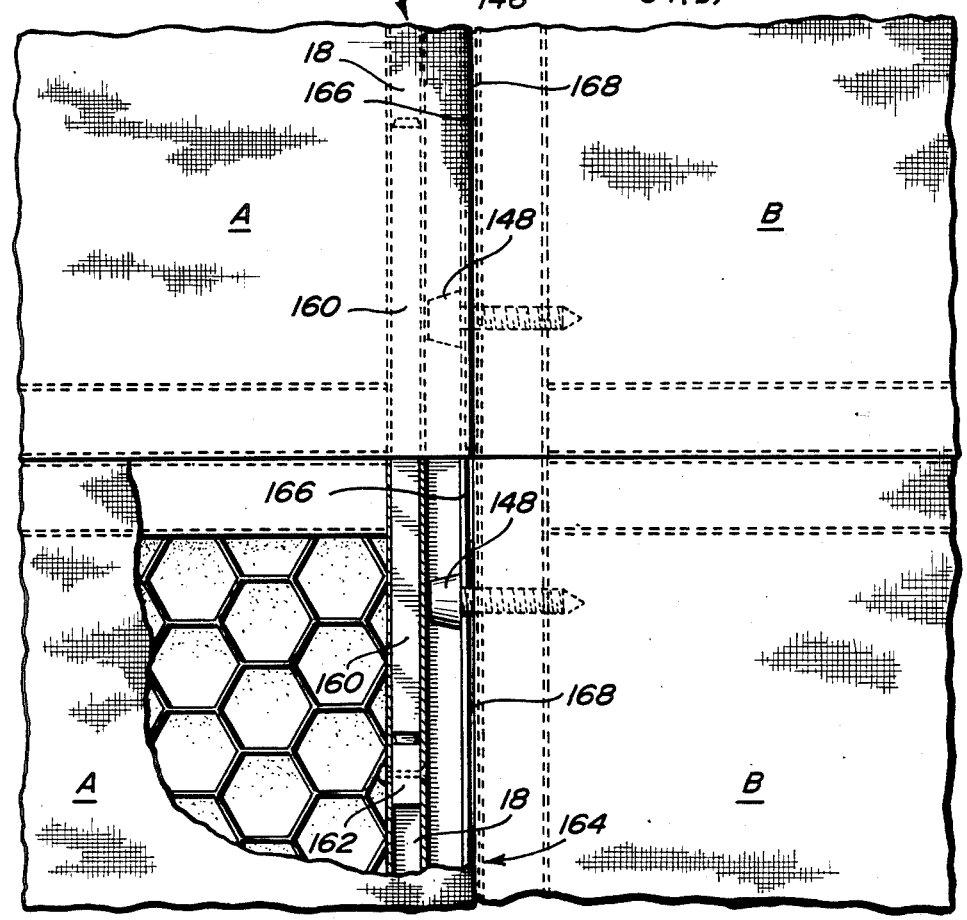
FIG. 7 is a front, cutaway view of the device of this invention showing the joining of the strut members to the panel and the stacking of one panel to another.

Referring now to FIG. 7, a front cutaway view shows panels A joined at their sides 166 to sides 168 of panels B by way of strut members 164 of panel A receiving button-type fasteners 148 of panel B. The stacking of panels A to each other is accomplished by pin 160. Pin 160 is seen inserted into shaft 18 of lower panel A and stopped by screw 162 which acts as a stop means. Screw 162 is placed at a point so it is less than pin 160's length to cause pin 160 to extend from strut 164 of lower panel A. Upper panel A receives the extension of pin 160 (in phantom) into its shaft (shown in phantom), and thereby the joining of upper and lower panels A is accomplished. The process of joining panels A to B was discussed relative to FIG. 6.

Referring now to FIG. 8, a schematic view of the device of this invention shows panels stacked atop and end-on-end of each other at different angles. Panel A shows an end run at 170 as discussed in FIG. 4. Panels B and C are joined at 172 as a linear run as discussed in FIG. 1. Panels D and C are joined at 174 as an angle of choice as discussed in FIG. 5. Panels A and B are joined at 176 at right angles as discussed in FIG. 3.

Panels have been joined to each other by the mating of the fabric covered snap fit strut members which define a panel end to the button-type fastener of another panel's other end. Panels have been stacked by pin 60 by the method discussed in FIG. 6. FIG. 8 shows that the panel joinders can be used for interchangeable component parts and are clearly concealed within the cover frame, thereby giving the panel a custom finished look.

There are variations which may be practiced and still be within the scope of this invention. For example, while the channel is a trapezoid and the shaft is at least a part of a square, these shapes may be changed as long as they perform the intended functions.

While the strut members are illustrated as being snap fitted, it is merely a preferred convenience.

The slit in the channel is only necessary when securing the button-type fastener. The channel configuration could be changed to receive an alternate fastener and still be within the scope of this invention.

While a fabric panel is discussed, it is merely a preferred material and any covering could be substituted and still be within the scope of this invention.

While the strut members form sides at right angles, right angles are not critical to the invention.

Finally, it is merely preferred that the strut members be aluminum extrusions. Any means of fabrication or change in material would still be within the scope of this invention.

The device of this invention has many advantages. Chiefly among these is the concealed panel joinder that creates a custom look for a continuing display from one panel to the next.

Also, the concealed joinder can be connected in straight lines, acute angles, right angles or obtuse angles.

Additionally, the interchangeable panels may be stacked or joined to form walls, shelving, counters, cabinets and/or projection screens.

Having now illustrated and described my invention, it is not my intention that such description limit the invention, but that the invention be limited only by a reasonable interpretation of the appended claims.

What is claimed is:

1. A pair of snap fitted linear rigid strut members together defining a panel frame end comprising a male member, said male member including a linear shaft and a linear trapezoidal channel with the longer parallel side including a slit midpoint to receive the shaft of a button-type fastener, said channel's short parallel side forming said shaft's top side, said shaft having a total of three sides with an open bottom, said other two sides being formed by parallel arms projecting from said trapezoid short side corners and wherein, also, said nonparallel sides of said channel each include an outward projecting horizontal flange, and a female member, said female member defining part of said panel edge so that a fabric panel cover surrounding at least a portion of said female member is internally held by said male member to thereby cover at least a portion of said female member.

2. The device according to claim 1 wherein said female member comprises a U shape sized to overfit said male member, said U's walls each including an inwardly projecting flange along a line adapted to snap fit above and with said corresponding male member flange, said U's bottom also including a pair of upward projecting parallel rails to register and outerfit with said parallel arm ends of said shaft.

3. The device according to claim 2 including a fabric panel cover wherein said cover originates from a panel to cover at least a portion of said female member's exterior and terminates between said male and female member, said pair of struts forming said panel end.

4. The device according to claim 2 wherein two pairs of said snap fitted male and female matrixes are movably joined by said fabric panel cover, said cover surrounding each of said female matrixes and terminating between each of said male and female matrixes, said covers movably joined to each other at the bottom right hand corner of said first pair and the bottom left hand corner of said second pair.

* * * * *